(12) United States Patent
Gudihal et al.

(10) Patent No.: US 12,540,947 B2
(45) Date of Patent: Feb. 3, 2026

(54) HIGH THROUGHPUT, FLUORESCENCE-BASED ESTIMATION OF MONOCLONAL ANTIBODY AGGREGATION WITH DISODIUM 3,3'-{[(E)-1,2-DIPHENYL-1,2-ETHENEDIYL]BIS(4,1-PHENYLENEOXY)} DI (1-PROPANESULFONATE) DYE FOR SUPERIOR SENSITIVITY AND SPECIFICITY

(71) Applicant: AGILENT TECHNOLOGIES SINGAPORE PTE LTD, Singapore (SG)

(72) Inventors: Ravindra Gudihal, Singapore (SG); Brian Liau, Singapore (SG)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 628 days.

(21) Appl. No.: 17/766,104

(22) PCT Filed: Oct. 28, 2020

(86) PCT No.: PCT/SG2020/050617
§ 371 (c)(1),
(2) Date: Apr. 1, 2022

(87) PCT Pub. No.: WO2021/086265
PCT Pub. Date: May 6, 2021

(65) Prior Publication Data
US 2022/0334125 A1    Oct. 20, 2022

Related U.S. Application Data

(60) Provisional application No. 62/926,540, filed on Oct. 27, 2019.

(51) Int. Cl.
*G01N 33/68*    (2006.01)
*G01N 33/58*    (2006.01)

(52) U.S. Cl.
CPC ....... *G01N 33/6854* (2013.01); *G01N 33/582* (2013.01)

(58) Field of Classification Search
CPC ............. G01N 33/6854; G01N 33/582; G01N 33/54346; G01N 21/6428; G01N 2021/7786; A61K 49/0058; A61K 49/0065; A61K 49/0093; B82Y 15/00; B82Y 30/00; B82Y 40/00; B82Y 5/00; C07D 235/16; C07F 9/5022; C09K 11/06
See application file for complete search history.

(56) References Cited

FOREIGN PATENT DOCUMENTS

| EP | 3508852 A1 | 7/2019 |
| WO | WO 2010/109204 A1 | 9/2010 |
| WO | WO-2018043688 A1 * | 3/2018 ............. G01N 21/64 |

OTHER PUBLICATIONS

He et al., J of Pharm Science, American Chemical Society and American Pharmaceutical Association, US, vol. 99, No. 6, Jun. 1, 2010; pp. 2598-2608. (Year: 2010).*

(Continued)

*Primary Examiner* — Jana A Hines
(74) *Attorney, Agent, or Firm* — Lando & Anastasi, LLP (57) ABSTRACT

The disclosure teaches a high-throughput, fluorescence-based assay for rapid, semi-quantitative estimation of high-molecular weight aggregation in mAb samples. The method rapidly estimates mAb aggregation.

8 Claims, 7 Drawing Sheets

(56) References Cited

OTHER PUBLICATIONS

La et al., (ACS Appl. Mater. Interfaces 2018, 10, 12189-12216. Published Oct. 18, 2018). (Year: 2018).*

Andrea Hawe et al., "Extrinsic Fluorescent Dyes as Tools for Protein Characterization", Pharmaceutical Research, vol. 25, No. 7, Jul. 2008, pp. 1487-1499.

Hui Tong et al., "Protein Detection and Quantitation by Tetraphenylethene-Based Fluorescent Probes with Aggregation-Induced Emission Characteristics", J. Phys. Chem. B 2007, 111, pp. 11817-11823.

Olubukayo-Opeyemi Oyetayo et al., "Experimental Model System to Study pH Shift-Induced Aggregation of Monoclonal Antibodies Under Controlled Conditions", Research Paper, published online Feb. 29, 2016, 11 pages.

Hiroshi Imamura et al., "Fate of a Stressed Therapeutic Antibody Tracked by Fluorescence Correlation Spectroscopy: Folded Monomers Survive Aggregation", The Journal of Physical Chemistry, B 2017, 121, pp. 8085-8093.

Sheun Oshinbolu et al., "Evaluation of fluorescent dyes to measure protein aggregation within mammalian cell culture supernatants", J. Chem Technol Biotechnol 2018; 93: 909-917.

Yuning Hong et al., "Monitoring and Inhibition of Insulin Fibrillation by a Small Organic Fluorogen with Aggregation-Induced Emission Characteristics", JACS, J. Am. Chem.Soc. 2012, 134, 1680-1689.

He F. et al., "Detection of IgG aggregation by a high throughput method based on extrinsic fluorescence", Journal of Pharmaceutical Sciences, American Chemical Society and American Pharmaceutical Association, US, vol. 99, No. 6, Jun. 1, 2010 (Jun. 1, 2010), pp. 2598-2608.

Chunlei Zhu et al: "Aggregation-Induced Emission: A Trailblazing Journey to the Field of Biomedicine", ACS Applied Bio Materials, vol. 1, No. 6, Dec. 17, 2018 (Dec. 17, 2018), pp. 1768-1786.

"International Search Report and Written Opinion, PCT Application No. PCT/SG2020/050317", dated Feb. 17, 2021, 9 pages.

Chunlei Zhu et al: "Aggregation-Induced Emission: A Trailblazing Journey to the Field of Biomedicine", ACS Applied Bio Materials, vol. 1, No. 6, Oct. 30, 2018, pp. 1768-1786.

"International Search Report and Written Opinion, PCT Application No. PCT/SG2020/050617", dated Feb. 17, 2021, 9 pages.

* cited by examiner

HIGH THROUGHPUT, FLUORESCENCE-BASED ESTIMATION OF MONOCLONAL ANTIBODY AGGREGATION WITH DISODIUM 3,3'-{[(E)-1,2-DIPHENYL-1, 2-ETHENEDIYL]BIS(4,1-PHENYLENEOXY)} DI (1-PROPANESULFONATE) DYE FOR SUPERIOR SENSITIVITY AND SPECIFICITY

CROSS-REFERENCES TO RELATED APPLICATIONS

This application is a national stage filing under 35 U.S.C 371 of PCT application number PCT/SG2020/050617, having an international filing date of Oct. 28, 2020, which claims priority to Singapore patent application Ser. No. 10202010646r (the "'646 Application"), filed Oct. 27, 2020 by Brian Liau et al., entitled "High Throughput, Fluorescence-Based Estimation Of Monoclonal Antibody Aggregation With Disodium 3,3'-{[E-1,2-Diphenyl-1,2-Ethenediyl]Bis(4,1-Phenyleneoxy)}Di(1-Propanesulfonate) Dye For Superior Sensitivity And Specificity", which application claims priority to U.S. Provisional Patent Application Ser. No. 62/926,540 (the "'540 Application"), filed Oct. 27, 2019 by Brian Liau et al., entitled, "High Throughput, Fluorescence-Based Estimation Of Monoclonal Antibody Aggregation With Disodium 3,3'-{[E-1,2-Diphenyl-1,2-Ethenediyl]Bis(4,1-Phenyleneoxy)}Di(1-Propanesulfonate) Dye For Superior Sensitivity And Specificity," the disclosures of which are incorporated herein by reference in their entirety for all purposes.

The respective disclosures of these applications/patents (which this document refers to collectively as the "Related Applications") are incorporated herein by reference in their entirety for all purposes.

FIELD OF THE INVENTION

The subject invention relates to a method for rapidly screening monoclonal antibodies through estimating monoclonal antibody (mAb) aggregation using a high throughput, fluorescence-based assay in a format for rapid, semi-quantitative estimation of high-molecular weight aggregation in mAb samples.

BACKGROUND

Aggregation of monoclonal antibodies greatly increases the immunogenicity of mAb therapeutics and is controlled and monitored as a critical quality attribute. The current gold standard for aggregation analysis is size-exclusion chromatography (SEC), which takes approximately 5-30 minutes to analyze each sample.

Screening hundreds of mAbs, e.g. during lead optimization with SEC is challenging and slow, taking minutes per sample. A method for rapidly estimating mAb aggregation (seconds per sample) would complement existing chromatography-based workflows, greatly decreasing overall analysis time.

SUMMARY

This disclosure teaches a high-throughput fluorescence-based assay for estimation of aggregation in purified monoclonal antibody samples using the dye disodium 3,3'-{[(E)-1,2-diphenyl-1,2-ethenediyl]bis(4,1-phenyleneoxy)}di(1-propanesulfonate), CAS number 953792-48-8. The dye is known by the acronym BSPOTPE.

The disclosure teaches an assay that takes ≤10 seconds to analyze each sample, representing significant time savings.

In one embodiment, the disclosure teaches a method for screening monoclonal antibodies (mABs) comprising, adding Fluorescent dye to mAb samples in solution, inducing mAb aggregation by applying stress, to mimic the formation of mAb aggregates during cell culture, bioprocessing, shipment or storage, or combinations of the foregoing, wherein the added dye increases in fluorescence in linear proportion to the mAb's aggregation content as measured by size-exclusion chromatography, measuring the fluorescence, optionally in multi-well plate format, optionally using a fluorimeter, and elucidating the linear relationship between fluorescence signal and mAb aggregation content in calibration experiments, and using said relationship to rapidly estimate aggregation in subsequent experiments. In one embodiment, rapidly can be defined as $\leq \frac{1}{10}^{th}$ the time taken to measure each sample using the best current size-exclusion chromatography techniques. In one embodiment, it takes a minimum of about 3 minutes (180 seconds) to measure one sample using size-exclusion chromatography.

In one embodiment, the fluorescent technique scans each sample in ≤10 seconds.

In some embodiments, elucidating the linear relationship between fluorescence signal and mAb aggregation content in calibration experiments includes constructing a standard curve.

In some embodiments, constructing a standard curve comprises adding the fluorescent dye to a reference aggregated mAB in solution, detecting fluorescence of the reference aggregated mAB, the standard curve having a horizontal coordinate of concentration and vertical coordinate of fluorescence intensity.

In some embodiments, the standard curve is linear, a linear trendline is fitted to the standard curve.

In one embodiment, the dye is a tetraphenylethylene derivative, (TPE derivative). In one embodiment, the dye is disodium 3,3'-{[(E)-1,2-diphenyl-1,2-ethenediyl]bis(4,1-phenyleneoxy)}di(1-propanesulfonate). In one embodiment, the TPE derivative has side-chains of the length of 3 carbons side chain attached to the aromatic groups of the TPE molecule. In one embodiment, the TPE derivative does not have a side-chain length of 2 or 6 carbons side chain attached to the aromatic groups of the TPE molecule. In one embodiment, the TPE derivative has a side-chain length of 4 carbons side chain attached to the aromatic groups of the TPE molecule. In one embodiment, the TPE derivative is a sulfonated derivative. In one embodiment, the TPE derivative has one or more sulfonates side chain attached to the aromatic groups of the TPE molecule. In one embodiment, the TPE has two or more sulfonates side chain attached to the aromatic groups of the TPE molecule. In one embodiment, the TPE has three or more sulfonates side chain attached to the aromatic groups of the TPE molecule.

In one embodiment, the analysis of each sample takes ≤10 seconds. In one embodiment, the analysis takes ≤30 seconds. In one embodiment, the analysis takes ≤60 seconds. In one embodiment, the analysis takes ≤120 seconds. In one embodiment, the analysis takes between 0.1 and 10 seconds, 0.1 and 30 seconds, 0.1 and 60 seconds, or 0.1 and 120 seconds.

In one embodiment, the full spectral scan takes ≤120 seconds. In one embodiment, the full spectral scan takes ≤60 seconds. In one embodiment, the full spectral scan takes ≤150 seconds. In one embodiment, the full spectral scan takes ≤180 seconds. In one embodiment, the full spectral scan takes between 0.1 and 120 seconds, 0.1 and 60 seconds, 0.1 and 150 seconds, or 0.1 and 180 seconds.

In one embodiment, the analysis is performed in a multi-well plate format. In one embodiment, the analysis is performed in 96-well plates. In one embodiment, the analysis is performed in a nano-scale plate.

In one embodiment, the analysis is performed using a fluorimeter. In one embodiment, the analysis is performed using a Cary Eclipse.

In one embodiment, the stress is selected from the group consisting of, but not limited to low pH, high temperature, shaking, adsorption to surfaces and combinations thereof.

In one embodiment, the disclosure teaches a method for determining monoclonal antibody aggregation comprising adding fluorescent dye to mAb samples, inducing mAb aggregation by applying stress to mimic the formation of mAb aggregates during cell culture, bioprocessing, shipment or storage, or combinations of the foregoing, wherein the added dye increases in fluorescence in linear proportion to the mAb's aggregation content as measured by size-exclusion chromatography, measuring the fluorescence in multi-well plate format, optionally using a fluorimeter, and elucidating the linear relationship between fluorescence signal and mAb aggregation content in calibration experiments, and using said relationship to rapidly estimate aggregation in subsequent experiments.

In some embodiments, elucidating the linear relationship between fluorescence signal and mAb aggregation content in calibration experiments includes constructing a standard curve.

In some embodiments, constructing a standard curve comprises adding the fluorescent dye to a reference aggregated mAB in solution, detecting fluorescence of the reference aggregated mAB, the standard curve having a horizontal coordinate of concentration and vertical coordinate of fluorescence intensity.

In some embodiments, the standard curve is linear, or a linear trendline is fitted to the standard curve.

In one embodiment, the disclosure teaches a method for determining monoclonal antibody (mAb) aggregation comprising adding a fluorescent dye to an mAb sample to be tested in solution, wherein aggregated mAb in the sample reacts with (binds to) the fluourscent dye, detecting fluorescence in the sample to be tested, adding the fluorescent dye to a reference aggregated mAB in solution, detecting fluorescence of the reference aggregated mAB; wherein a standard curve of aggregation is constructed according to the fluorescence intensity of a reference aggregated mAB and the concentration of a reference aggregated mAB, the standard curve having a horizontal coordinate of concentration and vertical coordinate of fluorescence intensity; and comparing the fluorescence of the mAb sample to be tested with the standard curve to quantify the concentration of aggregated mAb in the sample to be tested.

In one embodiment, the disclosure teaches a method for determining monoclonal antibody aggregation (mAB) comprising adding a fluorescent dye to an mAb sample to be tested in solution, wherein aggregated mAb in the sample reacts with (binds to) the fluorescent dye, detecting fluorescence in the sample to be tested, comparing the fluorescence to a standard curve derived from the fluorescence of aggregation reference standards to quantify the aggregation content of the sample to be tested.

In some embodiments, the standard curve of aggregation is constructed according to the fluorescence intensity of a reference aggregated mAB and the concentration of the reference aggregated mAB, the standard curve having a horizontal coordinate of concentration and vertical coordinate of fluorescence intensity.

In some embodiments, the aggregation content of the reference aggregated mAB is measured by size-exclusion chromatography. In some embodiments, the standard curve is linear, or a linear trendline is fitted to the standard curve. In some embodiments linear means $R^2 \geq 0.9$.

DETAILED DESCRIPTION

Reference will now be made in detail to representative embodiments of the invention. While the invention will be described in conjunction with the enumerated embodiments, it will be understood that the invention is not intended to be limited to those embodiments. On the contrary, the invention is intended to cover all alternatives, modifications, and equivalents that may be included within the scope of the present invention as defined by the claims.

One skilled in the art will recognize many methods and materials similar or equivalent to those described herein, which could be used in and are within the scope of the practice of the present invention. The present invention is in no way limited to the methods and materials described.

All publications, published patent documents, and patent applications cited in this application are indicative of the level of skill in the art(s) to which the application pertains. All publications, published patent documents, and patent applications cited herein are hereby incorporated by reference to the same extent as though each individual publication, published patent document, or patent application was specifically and individually indicated as being incorporated by reference.

Definitions

Unless defined otherwise, technical and scientific terms used herein have the same meaning as commonly understood by one of ordinary skill in the art to which this invention belongs. Although any methods, devices, and materials similar or equivalent to those described herein can be used in the practice or testing of the invention, the preferred methods, devices, and materials are now described.

As used in this application, including the appended claims, the singular forms "a," "an," and "the" include plural references, unless the content clearly dictates otherwise, and are used interchangeably with "at least one" and "one or more." Thus, reference to "a polynucleotide" includes a plurality of polynucleotides or genes, and the like.

As used herein, the term "about" represents an insignificant modification or variation of the numerical value such that the basic function of the item to which the numerical value relates is unchanged.

As used herein, the terms "comprises," "comprising," "includes," "including," "contains," "containing," and any variations thereof, are intended to cover a non-exclusive inclusion, such that a process, method, product-by-process, or composition of matter that comprises, includes, or contains an element or list of elements does not include only those elements but may include other elements not expressly listed or inherent to such process, method, product-by-process, or composition of matter.

As used herein, "determining", "determination", "detecting", or the like are used interchangeably herein and refer to the detecting or quantitation (measurement) of a molecule using any suitable method, including immunohistochemistry, fluorescence, chemiluminescence, radioactive labeling, surface plasmon resonance, surface acoustic waves, mass spectrometry, infrared spectroscopy, Raman spectroscopy, atomic force microscopy, scanning tunneling microscopy, electrochemical detection methods, nuclear magnetic resonance, quantum dots, and the like. "Detecting" and its variations refer to the identification or observation of the presence of a molecule in a biological sample, and/or to the measurement of the molecule's value.

As used herein. "heat" or "high temperature" means a temperature in the range of 45-65° C. In one embodiment, the range is between 40-70° C. In one embodiment, the range is between 37-90° C. In one embodiment, the range is between 45-60° C. In one embodiment, the range is between 40-65° C. In one embodiment, the range is between 50-65° C. In one embodiment, the temperature is a 37° C. In one embodiment, the temperature is a 37° C. In one embodiment, the temperature is above 40° C. In one embodiment, the temperature is above 45° C. In one embodiment, the temperature is above 50° C. In one embodiment, the temperature is above 55° C. In one embodiment, the temperature is above 60° C. In one embodiment, the temperature is ≥70° C. In one embodiment, the temperature is ≥80° C. In one embodiment, the temperature is ≥90° C.

As used herein, "low pH" or "stress inducing low pH" means a pH of 6.5 or less. In one embodiment, a low pH means a pH between 2 and 6.5. In one embodiment, a low pH is between 2 and 6.0. In one embodiment, a low pH is 5.5 or less or between 2 and 5.5. In one embodiment, a low pH is 5.0 or less or between 2 and 5.0. In one embodiment, a low pH is 4.5 or less or between 2 and 4.0. In one embodiment, a low pH is 0.1 to 6.5.

When proteins (such as monoclonal antibodies) are subjected to stressful conditions, such as heat or low pH, they partially unfold and expose hydrophobic regions which would otherwise be embedded within the core of the protein. These regions are driven to associate with each other to minimize contact with water molecules, thus forming protein aggregates.

Common fluorescent dyes used to estimate protein aggregation include 8-Anilino-1-Naphthalenesulfonic Acid (ANS), 4,4'-Dianilino-1,1'-Binaphthyl-5,5'-Disulfonic Acid (Bis-ANS), Thioflavin T, SYPRO® Orange and PROTEOSTAT®. These dyes associate preferentially with the hydrophobic regions of proteins which are exposed upon aggregation, whereupon they increase their fluorescence through a variety of mechanisms.

Figure 4:
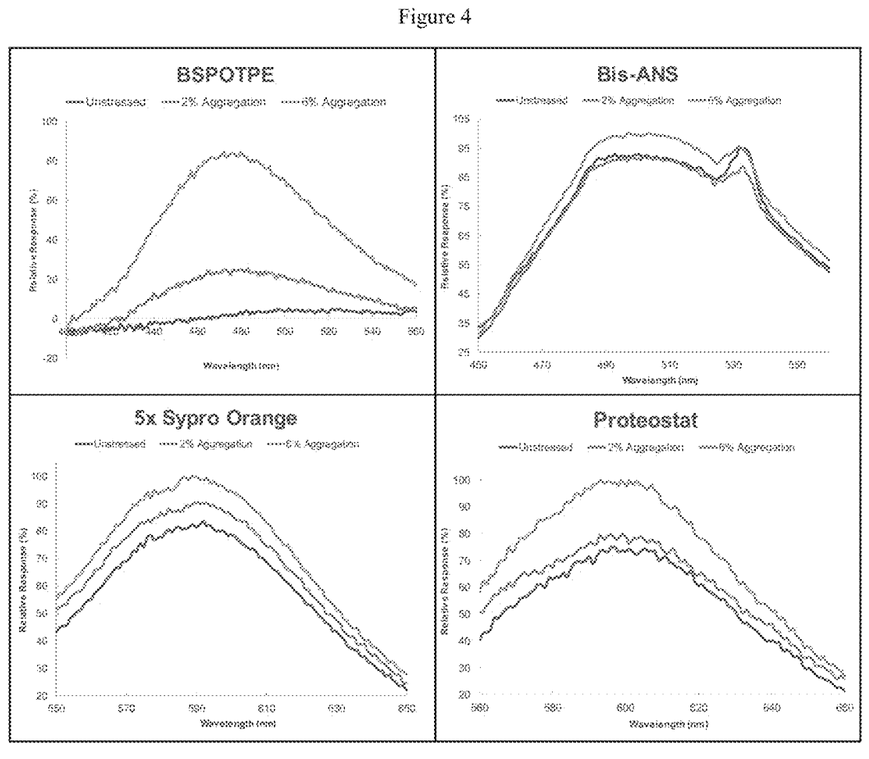
FIG. 4 shows the fluorescence spectra of BSTOPE and other dyes in the presence of mAb samples with varying degrees of aggregation.

These dyes have several drawbacks. ANS and Bis-ANS tend to have high background fluorescence, driven by the dye's partial association even with non-aggregated proteins. Thioflavin T suffers from poor sensitivity due to low quantum yield. In addition, many dyes including SYPRO®. Orange and PROTEOSTAT® have poor sensitivity to aggregates induced by pH stress (FIG. 4).

Aggregates generated through pH stress are representative of the type of aggregates that might be encountered in industrial bioprocessing because antibodies are often exposed to low pH during downstream processing. In contrast, the temperatures typically required to generate thermal stress-induced aggregates range from 45-65° C., and are unlikely to be encountered during bioprocessing.

The disclosure teaches a fluorescent assay that shows superior signal-to-background ratio and linearity with both pH-induced and thermal stress-induced aggregates. This disclosure teaches an assay useful as a general-purpose tool for monitoring monoclonal antibody aggregation during clonal selection and during downstream processing.

In one embodiment of the invention, a high-throughput fluorescence-based assay for estimation of aggregation in purified monoclonal antibody samples using the dye disodium 3,3'-{[(E)-1,2-diphenyl-1,2-ethenediyl]bis(4,1-phenyleneoxy)}di(1-propanesulfonate), CAS number 953792-48-8. The dye is known by the acronym BSPOTPE.

In another embodiment of the invention, the assay takes s 10 seconds to analyze each sample, representing significant time savings.

Figure 1:
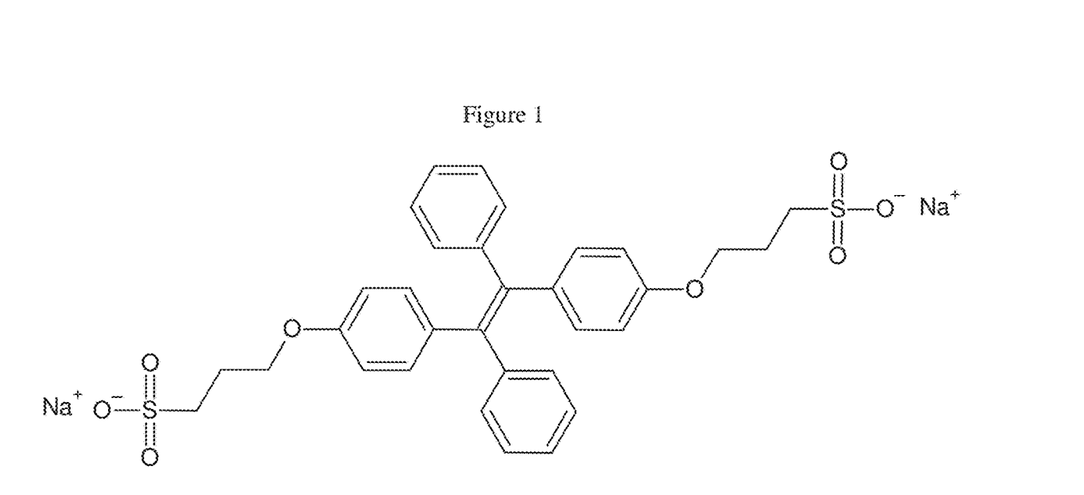
FIG. 1 shows the molecular structure of BSTOPE dye.

FIG. 1 shows the chemical structure of the fluorescent dye disodium 3,3'-{[(E)-1,2-diphenyl-1,2-ethenediyl]bis(4,1-phenyleneoxy)}di(1-propanesulfonate), CAS number 953792-48-8. The dye is known by the acronym BSPOTPE.

Figure 2:
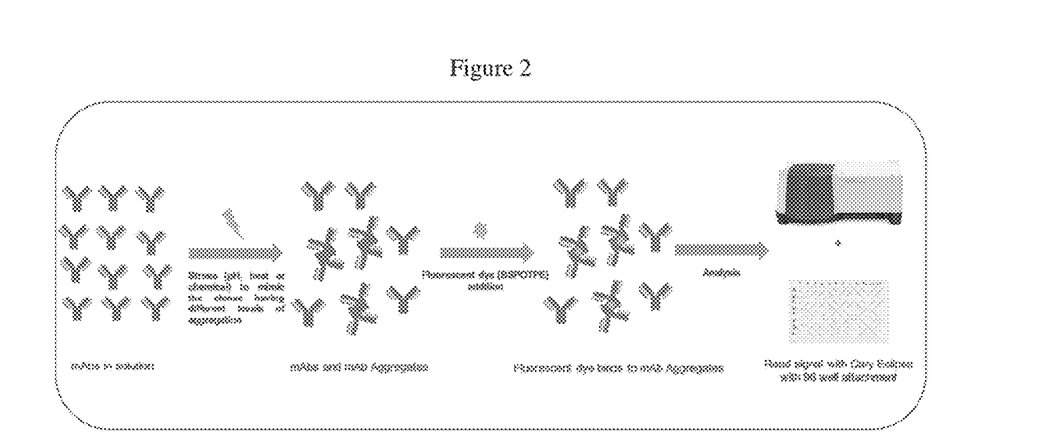
FIG. 2 shows a schematic of the experimental design.

FIG. 2 shows a schematic of the experimental design. Monoclonal antibodies Rituximab (Ristova® and Reditux®), Trastuzumab (Herceptin®), and NISTmAb were buffer exchanged into 50 mM Tris-HCl, pH 7.5 using ultra centrifugation columns. They were then stressed by exposure to transient low pH or high temperature to induce aggregation. Fluorescent dyes (BSPOTPE, Bis-ANS, SYPRO® Orange or PROTEOSTAT®) were then added to the samples, and fluorescence measured on a Cary Eclipse fluorimeter with 96-well plate attachment. SEC was then used to assess the true extent of aggregation in each sample.

Figure 3A:
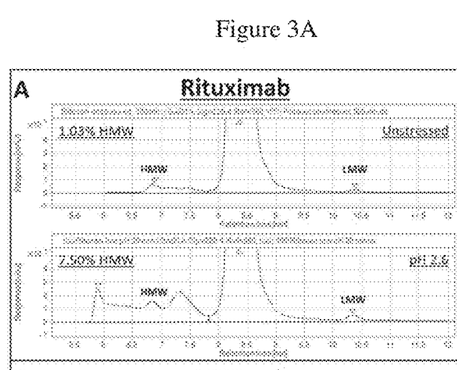
FIGS. 3A, 3B and 3C shows how transient pH stress induces aggregation in Rituximab, Trastuzumab and NISTmab. Size exclusion chromatography shows an increase in dimer, trimer and high molecular weight (HMW) species in stressed samples.
Figure 3B:
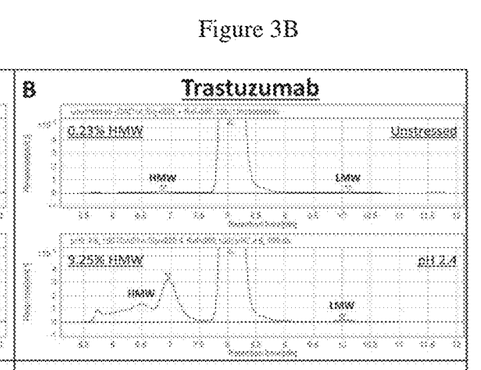
Figure 3C:
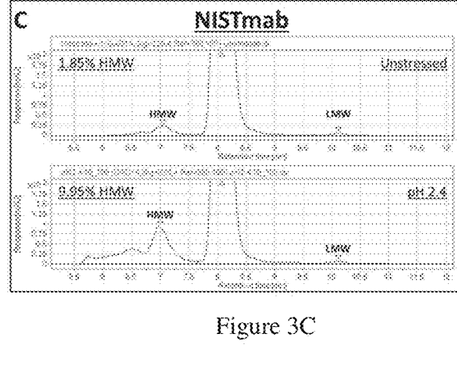
Figure 3D:
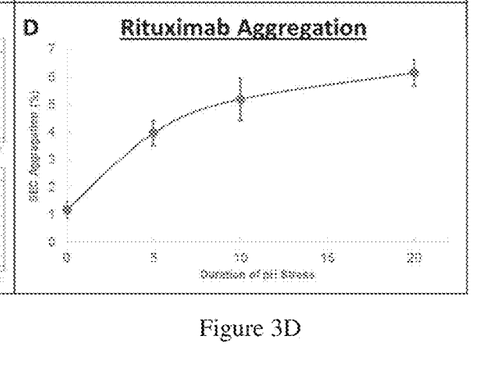
FIG. 3D shows how the degree of mAb aggregation can be controlled by varying the duration of pH stress.

FIGS. 3A, 3B and 3C show representative SEC traces with UV detection of unstressed mAbs (top panels) compared to mAbs exposed to transient stress at pH 2.4 or 2.6 (bottom panels). pH-stressed samples contained higher percentages of high molecular weight (HMW) species. Monomer and low molecular weight (LMW) species remained largely unchanged by pH stress. FIG. 3D shows the average percentage of HMW aggregates induced in Rituximab by 5, 10 and 20 mins of pH stress. Error bars represent standard deviations (N=8 independent experiments).

FIG. 4 shows the fluorescence spectra of aggregation-sensitive dyes BSPOTPE (FIG. 4A), Bis-ANS (FIG. 4B), SYPRO Orange (FIG. 4C), and PROTEOSTAT (FIG. 4D) in pH-stressed Rituximab samples with varying extents of aggregation. BSPOTPE has a much lower background fluorescence than the other dyes, and is therefore more sensitive at detecting both intermediate (2%) and high (6%) levels of aggregation. All spectra were normalized against the peak emission intensity of 6% aggregation samples. Thioflavin T did not yield significant fluorescent signals (FIG. 10). Instrument settings for BSTOPE: 50 µM, ex/em=350/370-560 nm, gain 800V; Bis-ANS: 50 µM, ex/em=390/450-600 nm, gain 600V; 5× SYPRO Orange: ex/em=495/550-650 nm, gain 800V; 1× ProteoStat: ex/em=470/560-660 nm, gain 800V.

Figure 5:
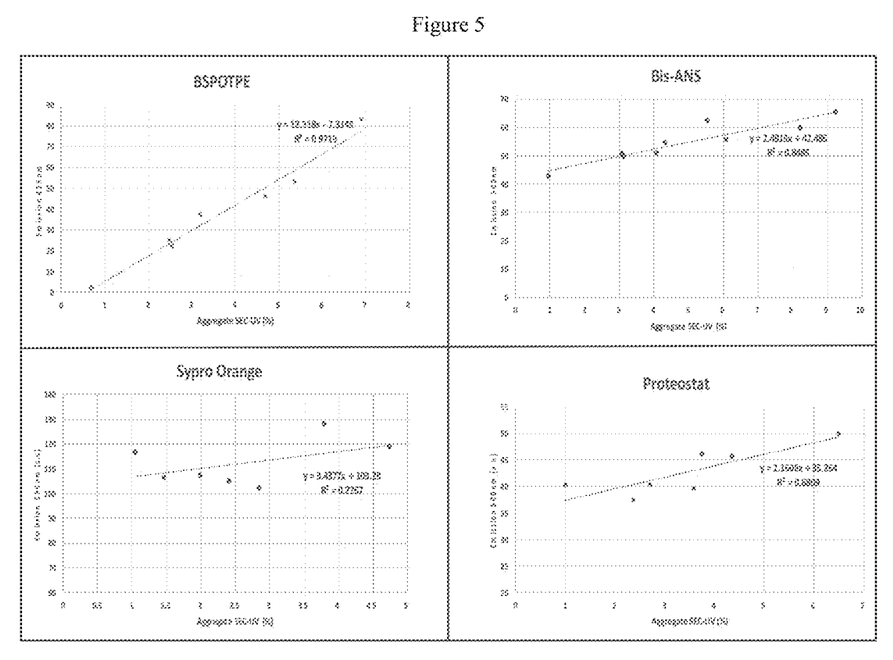
FIG. 5 shows the linear relationship between emission maxima of dyes and percentage of mAb aggregation measured by SEC.

FIG. 5 shows the linear relationship between the emission maxima of dyes and the percentage of Rituximab aggregation measured by SEC. BSPOTPE has superior linearity ($R^2=0.9717$) compared to Bis-ANS($R^2=0.8485$), SYPRO Orange ($R^2=0.2267$) and PROTEOSTAT ($R^2=0.6809$), and has lower background as shown by the smaller value of its y-intercept.

Figure 6A:
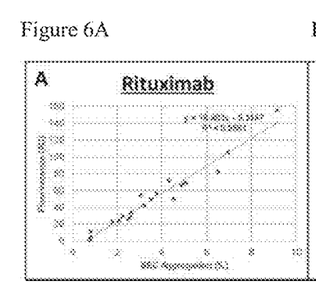
FIG. 6A-6C shows the linearity of BSTOPE dye's fluorescence response with Rituximab, Trastuzumab and NISTmab at varying levels of aggregation.
Figure 6B:
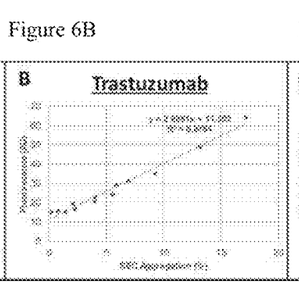
Figure 6C:
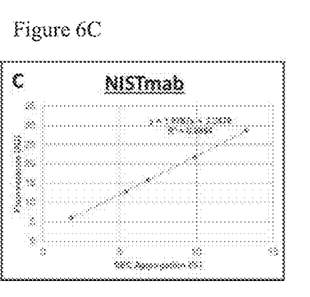

FIG. 6 shows the linearity of BSPOTPE fluorescence in pH-stressed Rituximab (FIG. 6A), Trastuzumab (FIG. 6B) and NISTmab (FIG. 6C) samples. All samples were tested at 1 mg/ml in a volume of 100 µl per well, with a final BSPOTPE concentration of 50 µM. Data shown are from N=3 independent experiments for Rituximab, N=2 for Trastuzumab, and N=1 for NISTmab.

Figure 7A:
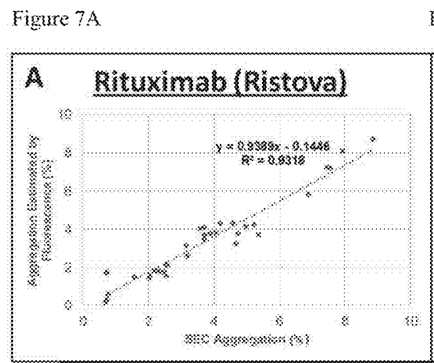
FIG. 7A shows the accuracy of the fluorescence assay when used to estimate aggregation in innovator therapeutic Rituximab (Ristova).
Figure 7B:
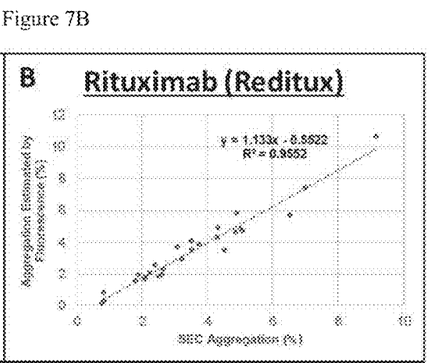
FIG. 7B shows the accuracy of the fluorescence assay when used to estimate aggregation in biosimilar therapeutic Rituximab (Reditux).
Figure 7C:
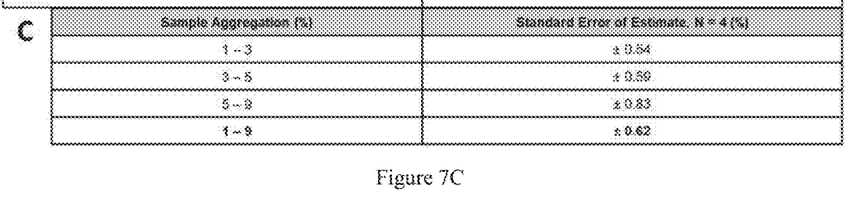
FIG. 7C shows the standard error of the fluorescence-based estimates when calculated for samples with low aggregation (1-3%), moderate aggregation (3-5%), and high levels of aggregation (5-9%). The standard error over the entire range of aggregation is also shown.

FIG. 7 shows the accuracy of the high-throughput fluorescence assay for mAb aggregation analysis. The regression line relating fluorescence and SEC aggregation percentages for Rituximab obtained in FIG. 6A was used to calibrate fluorescence-based estimates of Ristova (FIG. 7A), and Reditux (FIG. 7B) aggregation in a new set of N=4 independent experiments. The coefficients of the regression lines in panels A and B have slopes close to 1 and intercepts close to 0, indicating the assay is accurate. FIG. 7C shows the standard error of the fluorescence-based estimates calculated for both Ristova and Reditux samples with low aggregation (1-3%), moderate aggregation (3-5%), and high levels of aggregation (5-9%). The standard error over the entire range of aggregation is also shown.

To calculate standard error, the formula used was $$\sigma_{est} = \sqrt{\frac{\Sigma(Y-Y')^2}{N}}$$

where $\sigma_{est}$ is the standard error, Y is the true aggregation value as measured by size exclusion chromatography, Y' is the fluorescence-based aggregation estimate, and N is the number of pairs of samples tested.

Figure 8A:
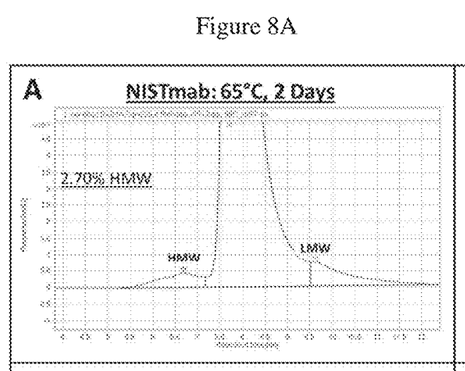
FIGS. 8A, 8B, and 8C show how heat stress applied over 2-4 days induces aggregation of NISTmab. Size exclusion chromatography shows an increase in high molecular weight (HMW) species in the stressed samples.
Figure 8B:
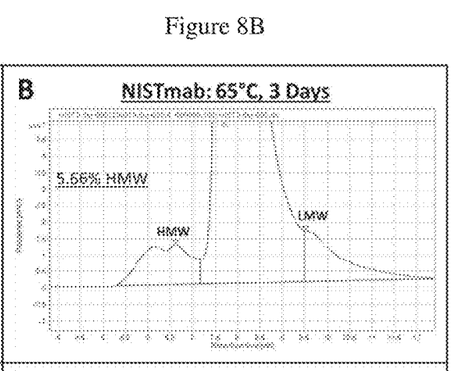
Figure 8C:
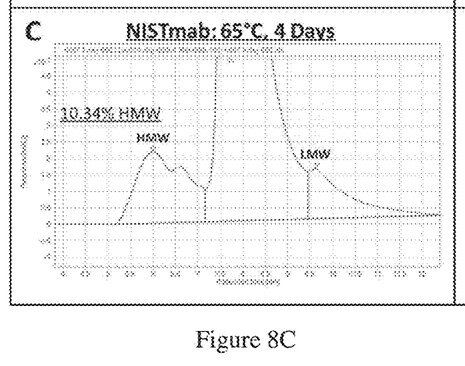
Figure 8D:
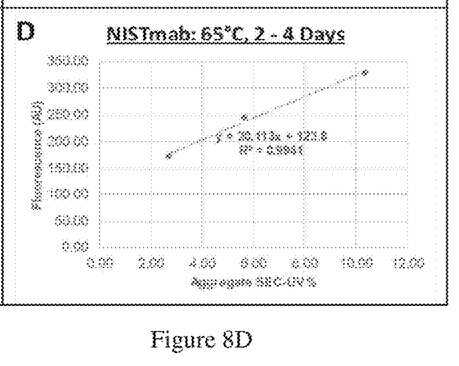
FIG. 8D shows the linearity of BSTOPE dye's fluorescence response with heat stressed NISTmab at varying levels of aggregation.

FIG. 8 shows representative SEC traces with UV detection of NISTmab exposed to heat stress for 2 (FIG. 8A), 3, (FIG. 8B), and 4 days (FIG. 8C). Heat stressed samples contained higher percentages of high molecular weight (HMW) species. Monomer and low molecular weight (LMW) species remained largely unchanged by heat stress. FIG. 8D shows the linearity of BSPOTPE fluorescence in heat stressed NISTmab samples. All samples were tested at 1 mg/ml in a volume of 100 µl per well, with a final BSPOTPE concentration of 50 µM. Data shown are from N=1 experiment.

Figure 9A:
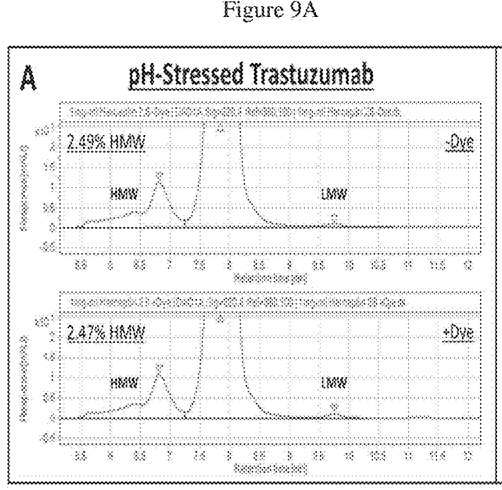
FIG. 9A shows representative chromatograms of aggregated Trastuzumab without (top panel) and with (bottom panel) BSPOTPE dye, illustrating that BSPOTPE dye does not significantly alter the aggregation profile.
Figure 9B:
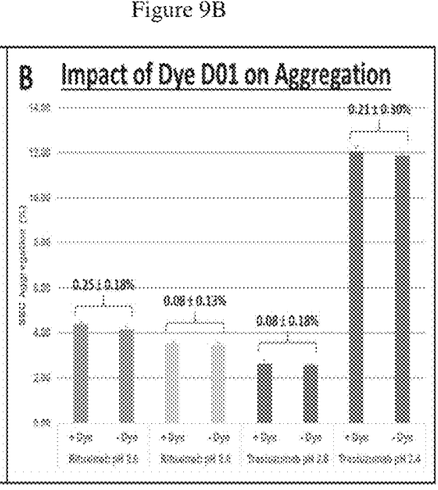
FIG. 9B shows summary statistics indicating that BSPOTPE dye does not significantly alter the percentage of HMW aggregation.

FIG. 9 shows that BSPOTPE has minimal impact on mAb aggregation. FIG. 9A shows representative chromatograms of aggregated Trastuzumab without (top panel) and with (bottom panel) 50 µM BSPOTPE. No significant difference in aggregation profile is observed. FIG. 9B shows the percentages of HMW aggregation in four aggregated samples of Rituximab and Trastuzumab with and without 50 µM BSPOTPE (n=3 technical replicates per sample).

Figure 10A:
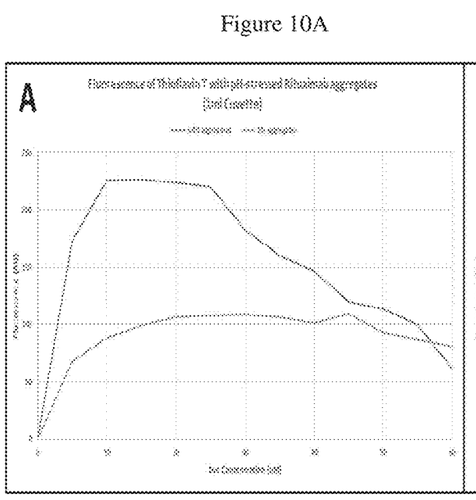
FIG. 10A shows Thioflavin T fluorescence in a 1 ml cuvette with increasing dye concentration with Rituximab samples containing 1% and 5.4% aggregation.
Figure 10B:
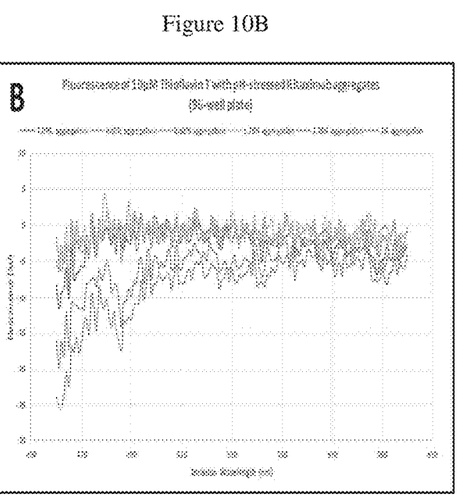
FIG. 10B shows Thioflavin T fluorescence in a 96-well plate format (100 μl volume per well) with Rituximab samples containing between 1%-7.09% aggregation.

FIG. 10 shows that Thioflavin T is insufficiently bright to be used in a plate-based assay for sensing mAb aggregation. FIG. 10A shows Thioflavin T fluorescence signal when it is added at between 5-60 µM to 1 mg/ml Rituximab samples with either 1% or 5.4% aggregation in a cuvette with 1 ml volume. The maximum aggregation-specific signal (difference between the two fluorescence traces) is seen at 10 µM. At higher concentrations, the dye undergoes quenching, reducing the observed fluorescence signal. Therefore, the optimal Thioflavin T concentration for an aggregation assay is 10 µM. FIG. 10B shows that even at the optimal concentration of 10 µM, Thioflavin T yields insufficient signal in a plate-based format with 100 µl sample volume to discriminate between 1 mg/ml Rituxmab samples of varying aggregation levels. Thioflavin T Ex=430 nm, Em=460-600 nm ($E_{Max}=482$ nm).

EXAMPLES

All fluorescence assays were carried out in 50 mM Tris-HCl buffer, pH 7.5. To perform fluorescence assays, BSPTOPE was first reconstituted in 50 mM Tris-HCl buffer, pH 7.5, yielding a 1 mM stock solution. Test samples were 1 mg/ml of monoclonal antibodies in Tris-HCl with varying degrees of aggregation. The BSPOTPE stock solution was added to mAb samples to attain a final BSPOTPE concentration of 50 µM. The final volume of each well was 200 µl.

To generate aggregated samples, Rituximab (Ristova and Reditux), Trastuzumab (Herceptin), and NIST mAb (RM8671) were buffer exchanged into 50 mM Tris-HCl, pH 7.5, transiently acidified through the addition of 1M HCl (pH 2.4-2.6 for 5-20 mins), neutralized through the addition of 1M NaOH, then incubated at 37° C. overnight.

Fluorescence measurements were carried out on a Cary Eclipse Fluorescence Spectrophotometer with 96-well plate attachment using four different aggregation-sensitive dyes with the following parameters:
1. BSPOTPE Dye: Ex=350 nm, Em=370-670 nm ($E_{Max}=475$ nm), Concentration=50 µM.
2. Bis-ANS: Ex=390 nm, Em=450-600 nm ($E_{Max}=500$ nm), Concentration=50 µM.
3. Sypro Orange: Ex=495 nm, Em=550-650 nm ($E_{Max}=580$ nm), Concentration=5×.

4. Commercially Available Kit: Ex=470 nm, Em=560-660 nm ($E_{Max}$=600 nm), Concentration, According to manufacturer's instructions.

For spectral scans, the Cary Eclipse "Scan" application was used. For fluorescence aggregation assays, the Cary Eclipse "Advanced Reads" application was used and only $E_{Max}$ was measured. Excitation and emission slits were 5 nm, and the High gain setting (800V) was used unless detector saturation was observed, in which case the Medium gain setting was used. Spectral scans required ≤2 minutes per sample, whereas measurements at $E_{Max}$ required ≤10 seconds per sample.

To correlate and verify sample aggregation, Size-exclusion chromatography (SEC) was performed on an Agilent 1260 Infinity II Bio-Inert LC with Advance Bio SEC 4.6× 300 mm, 300 Å, 2.7 µm columns and an Agilent 1260 Infinity II Diode Array Detector. Injection volumes were 20 µl, and the mobile phase was 50 mM phosphate buffer +150 mM sodium chloride, pH 7.4, at a flow rate of 0.8 ml/min. The stop time was set at 25 minutes, with 10 minutes post time. Chromatograms of absorbance at 220 nm were integrated to identify high molecular weight aggregates (retention time ~5.5-7.6 mins), the monomer peak (retention time ~8.2 mins), and low molecular weight fragments (retention time ~10-10.5 mins).

To generate calibration curves (standard curves) correlating BSPOTPE fluorescence with sample aggregation, BSPOTPE was mixed with pH-stressed mAbs ranging from low (~1%) to high (>8%) aggregation. Each mixture was then split into two identical samples, with one sample measured on the Cary Eclipse, and the other measured by SEC. A linear trendline was fitted to the data, and this information was then used to estimate mAb aggregation in subsequent experiments.

Low throughput: the current standard for aggregation analysis is size-exclusion chromatography, which takes approximately 30 minutes to analyze each sample. In contrast, this disclosure teaches an assay that takes ≤2 minutes to analyze each sample, representing significant time savings.

High background with unstressed samples: this disclosure teaches an assay that demonstrates significantly lower background signal with unstressed samples as compared to Bis-ANS, Sypro Orange, and Proteostat.

Poor sensitivity with pH stressed samples: this disclosure teaches an assay that demonstrates significantly higher signal-to-background as compared to Bis-ANS, Sypro Orange, and Proteostat. In addition, this disclosure teaches an assay that also demonstrates high sensitivity with thermal stress-induced aggregates.

The present disclosure teaches superior linearity, lower background, and higher sensitivity to pH stress induced aggregates as compared to assays using Bis-ANS, Sypro Orange, and Proteostat. Further, the present disclosure teaches a method that outperforms Thioflavin T.

The invention claimed is:

1. A method for screening monoclonal antibodies (mAB) for aggregation comprising,
   - adding a tetraphenylethylene derivative fluorescent dye comprising one or more three-carbon side chains attached to an aromatic group of the tetraphenylethylene molecule to mAb samples in solution;
   - inducing mAb aggregation by applying stress to mimic the formation of mAb aggregates;
   - measuring fluorescence of the aggregated mAb samples;
   - measuring an aggregation content of a reference mAb sample using size-exclusion chromatography; and
   - determining an aggregation content of the aggregated mAb samples by fitting a fluorescence intensity of the aggregated mAb samples to a standard curve prepared from the aggregation content of the reference mAb sample, wherein the fluorescence intensity is linearly correlated to the mAB aggregation content.

2. The method of claim 1, wherein the tetraphenylethylene derivative fluorescent dye is disodium 3,3'-{[(E)-1,2-diphenyl-1,2-ethenediyl]bis(4,1-phenyleneoxy)}di(1-propanesulfonate).

3. The method of claim 1, wherein the method is performed using a fluorimeter in a multi-well plate format.

4. The method of claim 1, wherein the applied stress is selected from the group including low pH and high temperature.

5. The method of claim 1, wherein each mAb sample is screened in less than or equal to 120 seconds.

6. The method of claim 1, wherein the dye is disodium 3,3'-{[(E)-1,2-diphenyl-1,2-ethenediyl]bis(4,1-phenyleneoxy)}di(1-propanesulfonate).

7. The method of claim 1, wherein the tetraphenylethylene derivative fluorescent dye includes one or more sulfonate side chains.

8. The method of claim 4, wherein the applied stress is a pH of 6.5 or less.

* * * * *